United States Patent Office 3,193,476
Patented July 6, 1965

3,193,476
ELECTROLYTIC HYDRODIMERIZATION OF TWO
DIFFERENT α,β-OLEFINIC COMPOUNDS
Manuel M. Baizer, St. Louis, Mo., assignor to Monsanto
Company, a corporation of Delaware
No Drawing. Filed Dec. 29, 1961, Ser. No. 163,028
15 Claims. (Cl. 204—73)

This application is a continuation-in-part of my copending applications S.N. 145,480 and S.N. 145,482, filed October 16, 1961, and now abandoned, and S.N. 75,130, filed December 12, 1960, and now forfeited; the aforesaid applications having been abandoned or forfeited in favor of continuation-in-part applications S.N. 337,546, filed January 14, 1964; S.N. 333,647, filed December 26, 1963, and S.N. 337,540, filed January 14, 1964.

This invention relates to the manufacture of polyfunctional compounds and more particularly provides a new and valuable electrolytic process for reductive coupling of two unlike alpha,beta-olefinic carboxylates, nitriles and amides.

A general object of the invention is the provision of a process for the production of cyano alkanoates and amides, and for the production of carboxamido alkanoates. A further object is the provision of a process for the preparation of alkane di- or tetra-carboxylates, nitriles or carboxamides, particularly those having an odd number of carbon atoms or otherwise not obtainable by hydrodimerization of individual alpha-beta-olefinic carboxylates, nitriles or carboxamides. An important object of the present invention is the provision of a process to obtain the reduced, coupled product of two unlike alpha, beta-olefinic esters, nitriles or amides in preference to hydrodimerization products or other reaction products.

These and other objects of the invention are provided by the present process for reductive coupling of two different olefins selected from the group consisting of alpha, beta-olefinic carboxylates, nitriles and carboxamides in aqueous electrolytes under conditions suitable for electrolytic hydrodimerization. In general, the electrolytic reductive coupling is conducted in concentrated solution in an aqeuous electrolyte. It is desirable to employ fairly concentrated solutions in order to minimize undesired reactions of intermediate ions with the water of the electrolyte. The olefinic reactants will comprise at least 10% by weight of the electrolyte, and preferably at least 20% by weight or more. It is generally desirable to employ fairly high concentrations of salts in the electrolyte, for example constituting 30% or more by weight of the total amount of salt and water in the electrolyte, in order to obtain the desired solubility of the olefinic compounds.

It will be recognized that the term "coupling" as employed herein refers to the joining together of two different compounds and does not include dimerizations of a single compound.

The hydrodimerization of alpha,beta-olefinic carboxylates, nitriles and carboxamides is taught in my copending applications S.N. 145,480 and 145,482, filed October 16, 1961, and S.N. 75,130, filed December 12, 1960, the disclosures of which are incorporated herein by reference. The conditions taught in the referred-to applications for hydrodimerization are suitable for reductive coupling, except for such changes as may be indicated herein for the purpose of directing the process to production of reduced, coupled products in preference to hydrodimerization products.

Electrolysis, of course, has been practiced for many years and numerous materials suitable as electrolytes are known, making it within the skill of those in the art in the light of the present disclosure to select electrolytes for reductive coupling according to the present invention.

In general, any electrolytes suitable for hydrodimerization of the individual olefinic compounds are suitable for employment in reductive coupling reactions of such compounds. As discussed in my aforesaid copending applications, some olefinic compounds are subject to polymerization or other side reactions if the electrolyte is acidic, or excessively alkaline, and it will be necessary in such cases to conduct the reductive coupling in non-acidic solution, and in some cases below a pH at which undesirable side reactions occur, e.g., below about 9.5.

In effecting the reductive coupling of the present invention it is preferred to utilize a cathode having an overvoltage greater than that of copper and to subject to electrolysis in contact with such cathode a concentrated solution of a mixture of the defined olefinic compounds in an aqueous electrolyte under mildly alkaline conditions. In effecting the reductive couplings of the present invention, it is essential to obtain cathode potentials required for such couplings and therefore the salt employed should not contain cations which are discharged at substantially lower, i.e., less negative, cathode potentials. It is desirable that the salt employed have a high degree of water solubility to permit use of very concentrated solutions for concentrated salt solutions dissolve greater amounts of the organic olefinic compounds.

In addition to the foregoing considerations, a number of other factors are important in selecting salts suitable for good results. For example, it is undesirable that the salt cation form an insoluble hydroxide at the operating pH, or that it discharge on the cathode forming an alloy which substantially changes the hydrogen over-voltage and leads to poorer current efficiencies. The salt anion should not be lost by discharge at the anode with possible formation of by-products. If a cell containing a separating membrane is used, it is desirable to avoid types of anions which, in contact with hydrogen ions present in the anolyte chamber, would form insoluble acids and clog the pores of the membrane.

The term "consisting essentially of" as employed herein with respect to the solutions electrolyzed is intended to leave the solutions open to addition of other components which do not change the basic nature of the solutions with respect to the electrolytic reductive coupling process being conducted therein.

In general amine and quaternary ammonium salts are suitable for use in the present process. Certain salts of alkali and alkaline earth metals can also be employed to some extent, although they are more subject to interfering discharge at the cathode and the alkaline earth metal salts in general tend to have poor water solubility, making their use inadvisable.

According to the presently provided process, reduced, coupled products of two different olefinic compounds are produced as follows:

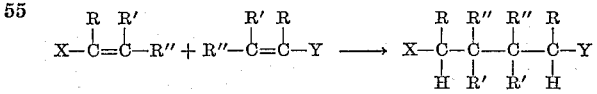

where X and Y are selected from the group consisting of cyano, carboxylate, and carboxamido groups, and each R, R' and R" is selected from the group consisting of hydrogen, alkyl (including cycloalkyl) and aryl radicals, particularly such radicals containing no more than eight carbon atoms. It will be recognized that a wide variance in the substituents is permissible, and each individual R, R' and R" can be the same as or different from another R, R' or R", and X and Y can be the same or different, so long as the two finally defined compounds to be coupled are different. While the illustrative formula show only one functional group, i.e., X or Y, in each reactive compound, it will be recognized that each olefinic reactant can have two or more such functional groups, and they can be of the same or different types. X and Y can be further defined as representing

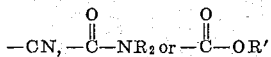

in which R represents hydrogen or an alkyl or aryl radical, and R' represents an alkyl or aryl radical, particularly such radicals containing no more than 8 carbon atoms.

While the molecular size of the olefinic compounds to be reductively coupled is not controlling, in general olefinic compounds containing more than 20 carbon atoms will be of little or no interest. It is generally preferable that the nitrile, carboxylate or carboxamide group be the only functional group other than the olefinic double bond, i.e., that the compound be saturated hydrocarbon except for the olefinic bond and the nitrile, carboxylate or carboxamide groups, viz. 1-cyano-alk-1-enes, 1-carbalkoxy-alk-1-enes, or 1-carboxamido-alk-1-enes.

Reductive coupling by the present process of various mixtures of olefinic compounds is shown in the table below. The coupled product is that to be expected from head-to-head addition, i.e., coupling at the carbon atoms beta to the functional groups.

| alpha,beta-Olefinic compounds | Coupled product |
| --- | --- |
| Methacrylonitrile and ethyl acrylate. | Ethyl delta-cyano caproate. |
| Crotonitrile and ethyl acrylate. | Ethyl delta-cyano gamma-methyl valerate. |
| Ethyl acrylate and methyl acrylate. | Ethyl methyl adipate. |
| Butyl acrylate and butyl methacrylate. | Dibutyl 2-methyl-adipate. |
| Acrylonitrile and N,N-diethyl-crotonamide. | Delta-cyano-N,N-diethyl-3-methyl-valeramide. |
| Acrylamide and acrylonitrile. | Delta-cyano-valeramide. |
| Methacrylamide and acrylonitrile. | Delta-cyano-alpha-methyl-valeramide. |
| Acrylamide and ethyl acrylate. | Ethyl butane-1-carboxamide-4-carboxylate. |
| Acrylonitrile and N,N-diethyl-beta-phenylacrylamide. | 5-cyano-N,N-diethyl-3-phenyl-valeramide. |
| Acrylonitrile and phenyl acrylate. | Phenyl-delta-cyano-valerate. |
| Acrylonitrile and ethyl cinnamate. | Ethyl 5-cyano-3-phenylvalerate. |

It will be realized that the coupled products described above will be accompanied by varying amounts of hydrodimerization products, depending upon the particular olefin pairs involved and the conditions of the electrolysis. The production of hydrodimerization products is not necessarily detrimental, as many of them are very useful. However, it will often be desired to direct the process toward preferential production of the coupled product. This can be done by regulating the cell voltage so that the electrolysis occurs at a cathode potential close to that for reduction of the monomer requiring the lowest voltage, i.e., the least negative voltage. This is particularly effective if the voltage for the more readily reducible monomer is appreciably lower than that for the other monomer, for example, 0.3 volt or more below that for the other monomer. In such cases, if the electrolysis is conducted at a cathode potential just sufficiently higher than that required for the more easily reducible monomer to achieve a practical reaction rate, there is very little if any hydrodimerization of the more difficultly reducible monomer, and the products are those resulting from coupling of the two monomers, or hydrodimerization of the more easily reducible monomer. It is possible to minimize the hydrodimerization of the more easily reducible monomer by "swamping" the mixture with the other monomer, employing only enough of the easily reducible monomer to keep the cathode potential at a value near that for reduction of the easily reducible monomer. It may be desirable to utilize small amounts of the easily reducible monomer and continuously or incrementally add such monomer as it is used up.

EXAMPLE 1

*Mixed reductive coupling of acrylonitrile and ethyl acrylate*

A catholyte was prepared by mixing 42.4 grams (0.8 mole) of acrylonitrile, 80.0 grams (0.8 mole) of ethyl acrylate, 80.0 grams of 76.5% methyltriethyl ammonium p-toluene sulfonate in water, and 42.0 grams of dimethyl formamide. The acrylonitrile contained a trace of p-nitrosodimethyl aniline as a stabilizer. A platinum anode was placed in an Alundum cup and immersed in a jacketed glass vessel containing the catholyte and 110 ml. of mercury as the cathode. An electric current was then passed through the resulting cell for three (3) hours at about 3.0 amperes to give a total of nine (9) ampere-hours. The E.M.F. gradually decreased from 35.5 volts at the start to a 21.0 volt reading at the conclusion. The cathode voltage measured against a saturated calomel electrode was —1.85. The catholyte temperature was allowed to rise to 40° C. where a constant value was maintained by means of a Dry Ice-acetone cooling bath. During the electrolysis a total of 4.0 ml. of glacial acetic acid was added to the catholyte in order to keep the pH around 7-9.5. After the electrolytic reduction the catholyte was transferred into a separatory funnel and diluted with water. The mercury was drawn off the bottom leaving a phase which was extracted five (5) times with 50 ml. portions of methylene chloride. The combined extracts were back-washed three (3) times with 50 ml. portions of water and, finally, dried over Drierite. The methylene chloride was stripped off at a Todd fractionating column leaving 180.3 grams of concentrate. Vapor phase chromatography showed that unreacted starting material, adiponitrile, diethyl adipate and ethyl delta-cyanovalerate were present. The volatiles were then removed on a steam bath with vacuum near the end leaving 22.6 grams liquid residue. The above procedure was totally duplicated in order to obtain sufficient product for a fractionation. This second run resulted in an additional 29.1 grams at the above stage. The combined residues were then fractionated at 18 mm. to give 4.3 grams, B.P. 133–135° C., $n_D^{25}$ 1.4267; 3.9 grams, B.P. 135–138° C., $n_D^{25}$ 1.4284; and 5.2 grams, B.P. 138–139° C., $n_D^{25}$ 1.4289. Vapor phase chromatography showed that the initial cut was 76.5% diethyl adipate and 22.4% ethyl delta-cyanovalerate; that the mid-fraction was 5.4% diethyl-adipate and 94.6% ethyl delta-cyanovalerate; and that the final segment was essentially 100% ethyl delta-cyanovalerate. Infrared analysis on the latter showed band for band agreement with a known pure sample of ethyl delta-cyanovalerate. The pot residue was then distilled at 1–5 mm. without fractionation. Vapor phase chromatography showed the initial cuts, 10.0 grams, to be approximately half adiponitrile and half ethyl delta-cyanovalerate, while the higher boiling fractions, 12.0 grams, were almost pure adiponitrile.

EXAMPLE 2

*Electrolytic mixed reductive coupling of acrylonitrile and diethyl maleate*

A catholyte was prepared consisting of 53.0 grams (1.0 mole) acrylonitrile, 86.0 grams (0.5 mole) diethyl maleate, 98.5 grams of 86.5% tetraethyl ammonium p-toluene sulfonate in water, and 10.0 grams of dimethyl formamide. An anolyte was formed from 20.0 grams of the above sulfonate solution, diluted with an equal volume of water and was placed in an Alundum cup holding a platinum anode. This entire anode unit was then immersed in a jacketed glass vessel containing the catholyte and 110 ml. of mercury as the cathode. The electrolysis was performed over a period of three (3) hours with the catholyte temperature slowly being elevated from 20 to 35° C. A total of 2.85 ml. of acetic acid was added in various increments to keep a weakly basic environment. During the first hour the cell voltage dropped from 36.5 to 25.2 volts and, thereafter, remained essentially constant. The cathode voltage plotted against a saturated calomel electrode leveled off at −1.40. Altogether some nine (9) ampere-hours were passed through the cell. The reactive mixture was worked up by adding water, drawing off the mercury layer, extracting five (5) times with 50 ml. portions of methylene chloride, back-washing the combined extracts twice (2) with water, and, finally, removing the residual moisture with Drierite. Next the methylene chloride was stripped off leaving 157.4 grams. The above procedure was rerun under identical conditions to obtain more material for a distillation. The combined concentrates totalled 328.8 grams. A 5.0 gram aliquot was taken for a vapor phase chromatography test which showed that no adiponitrile was present. Vacuum distillation on the remainder yielded a crude product which on redistillation at less than 1 mm. gave 7.1 grams, B.P. 126–130° C., $n_D^{25}$ 1.4408; and 70.9 grams, B.P. 159–160° C., $n_D^{25}$ 1.4427. Elemental analysis on the lower boiling fraction showed this product to be 58.13% carbon, 7.53% hydrogen, and 7.80% nitrogen. This compared favorably with the calculated values—58.13% carbon, 7.54% hydrogen and 6.17% nitrogen—for diethyl delta-(2-cyanoethyl)succinate. The experimental molecular weight was 212 as compared with the 227 calculated value. The major product was readily identified by infrared spectrum to be tetraethyl butanetetracarboxylate.

EXAMPLE 3

*Electrolytic mixed reductive coupling of acrylonitrile and 1-cyanobutadiene*

A catholyte was prepared consisting of 98.0 grams of acrylonitrile (1.84 moles), 18.3 grams of 1-cyanobutadiene, 115.0 grams of 80% tetraethylammonium p-toluene sulfonate, and a small amount of hydroquinone as stabilizer. A platinum anode was placed in an Alundum cup and immersed into a jacketed glass vessel containing the catholyte and 110 ml. of mercury as a cathode. An anolyte of 20 ml. of above salt solution along with an equal volume of water was employed. The resulting solution was then electrolyzed for three (3) hours with the amperage being varied from 0.25 to 3.0 amps. The cell voltage gradually decreased from around 19 to 9.0 volts; the temperature was controlled with a cooling bath between 20 and 25° C. During the electrolysis a total of 3.3 ml. acetic acid was introduced in order to keep the catholyte slightly alkaline. On completion of the reaction the resulting mixture was diluted with water, placed in a separatory funnel and the mercury drained off. The remaining single layer was extracted four (4) times with 50 ml. portions of methylene chloride. These extracts were back-washed and, then, dried over Drierite. Most of the solvent was stripped off through fractionating columns as well as the remainder of unreacted acrylonitrile. The residue totalled 30.8 grams and was connected to a Dry Ice-acetone trap where subjected to a vacuum of 10 mm. yielding 9.4 grams of distillate. The 25.9 grams residue was mixed with 1.0 gram of 5% palladium on carbon in 90 ml. of absolute alcohol and reduced in a Parr hydrogenation apparatus. The uptake was 14.75 pounds and was essentially complete within one-half hour. The catalyst was filtered off, washed with alcohol and, finally, the combined filtrates were evaporated to dryness on the water-bath, leaving 25.3 grams. Distillation through a column circa 3.2 mm. gave 15.8 grams, B.P. approximately 162° C., $n_D^{25}$ 1.4428. Vapor phase chromatography showed this fraction to be largely suberonitrile with a trace of adiponitrile; this was confirmed by infrared analysis. Elemental analysis on the above showed 70.4% carbon, 9.09% hydrogen and 20.75% nitrogen as compared, respectively to the theoretical values of 70.54%, 8.88% and 20.57%. The molecular weight was determined to be 138 (calculated value is 136). Continued distillation of the residue at less than 1 mm. gave some sebaconitrile.

EXAMPLE 4

*Electrolytic mixed reductive coupling of 1-cyanobutadiene and ethyl acrylate*

The usual set-up and apparatus were used. A catholyte was prepared consisting of 8.7 grams (0.11 mole) freshly redistilled 1-cyanobutadiene, 88.0 grams (0.88 mole) ethylacrylate, 43.0 grams acetonitrile, 99.0 grams of 80% tetraethyl ammonium p-toluene sulfonate, and a trace of hydroquinone as a stabilizer. The cathode was 110 ml. of mercury and 2.20 ml. of acetic acid slowly added over the reaction period to avoid excess alkalinity. Copper deposited in the coulometer showed that a total of five (5) ampere-hours had been passed over the two hour and forty minute reaction period. The temperature was gradually varied from 21° C. at the star up to 38° C. by means of the cooling bath. The cathode voltage measured against a saturated calomel electrode was −1.70. The amperage was gradually increased from 0.6 to a maximum of 2.7 amperes about midway through the reaction and, then, decreased to 0.25 ampere at the finish. The cell voltage diminished from start to finish, reaching a value of about 10.0 volts near the end. The reaction product was worked up by adding water, separating the mercury, and extracting four (4) times with methylene chloride. Then, the combined extracts were back-washed with water and, finally, dried over Drierite. The solvent was removed in the water bath with aid of an aspirator. The residual liquid totaled 12.4 grams and was dissolved in absolute alcohol in preparation for hydrogenation. One (1) gram of 5% palladium on charcoal was added and the resulting mixture was reduced on the Parr apparatus. Final uptake was 6.75 pounds. The catalyst was filtered off, washed and, then, the filtrate removed on a water bath. Fractionation through a Vigreux column under reduced pressure gave a crude product which on redistillation at 18 mm. yielded material, B.P. 160–164° C., $n_D^{25}$ 1.4353. Quantitative analysis showed this to be the expected product, ethyl-7-cyanoheptanoate—65.44% carbon, 9.74% hydrogen and 7.43% nitrogen were found as compared to the theoretical of 65.54%, 9.35%, and 7.64% respectively. Other products were present in minor portions but were not isolated or identified.

EXAMPLE 5

*Electrolytic mixed reductive coupling of acrylonitrile and methyl alpha-acetamidoacrylate*

A catholyte was prepared from 53.0 grams (1.0 mole) of acrylonitrile containing a trace of p-nitrosodimethylaniline as a stabilizer, 14.3 grams (0.1 mole) of methyl alpha-acetamidoacrylate, and 50 ml. of 80% tetraethyl ammonium p-toluene sulfonate in water. The cathode was 10 ml. of mercury with the apparatus being set-up as described in Example 1 except that the anolyte employed was composed of 10 ml. of the above 80% sulfonate solution in an equal volume of water. The cathode voltage saturated calomel electrode ratio was kept at −1.70 to −1.75 over the four and one-half (4½) hour reaction period. The temperature was maintained at a constant 20° C. to minimize possible hydrolysis. A total of 6.8 ampere-hours was passed through the cell. Acetic acid, 1.20 ml. was used in a pH control. The mercury was removed from the electrolyte as described in the preceding examples followed by four (4) extractions with 50 ml. portions of methylene chloride in the presence of some hydroquinone. After back-washing the combined extracts were dried over Drierite. Volatile solvent was removed at the water pump with warming on a steam bath. Fractional distillation gave 1.0 gram of a colorless, partially crystallized substance, B.P. 108° C./0.35 mm., $n_D^{25}$ 1.4561. Quantitative analysis indicated that this was a mixture comprised of 87.8% adiponitrile and 12.2% of coupled reductive product from the starting materials. Vapor phase chromatography confirmed that this was largely adiponitrile. Higher boiling cuts of 4.4 grams and 5.9 grams were obtained on continued distillation. The 4.4 grams fraction on redistillation gave a colorless liquid, B.P. 116–118° C./0.45 mm., $n_D^{25}$ 1.4365. Infrared analysis indicates that this was acrylonitrile. The 5.9 grams fraction was also redistilled, producing a very viscous liquid, B.P. 166–174° C./0.20 mm., $n_D^{25}$ 1.4680. Standard analytical methods showed this to possess 54.87% carbon, 6.87% hydrogen, 14.25% nitrogen, and to have a molecular weight of 197. Corresponding calculated values for methyl-alpha-acetamido-delta-cyano-valerate are 54.53%, 7.12%, 14.14% and 198. The above structure was confirmed by hdrogenation of the cyano group to an amino group, followed by simultaneous hydrolysis of the ester and acetamido groups to produce lysine.

EXAMPLE 6

*Electrolytic mixed reductive coupling of the nitrile of cinnamic acid and N,N-diethylacrylamide*

The nitrile of cinnamic acid and N,N-diethylacrylamide are reductively coupled following the general electrolysis procedure of Example 1. Since the nitrile is reduced at —1.42 to —1.60 volts, compared to —1.91 to —1.95 for the amide, the nitrile is employed in an amount of 0.2 mole with 1.0 mole of the amide in about 80 grams of 75% tetraethylammonium p-toluene sulfonate in water. The cell is operated at an amperage between 1 and 2 to cause electrolysis as a cathode potential circa —1.5 to —1.7 volts. The resulting N,N-diethyl-5-cyano-4-phenylvaleramide can be separated from the electrolyte along with hydrodimerized cinnamic acid nitrile by extraction procedures such as those illustrated in Example 1, and isolated by usual methods.

EXAMPLE 7

*Electrolytic mixed reductive coupling of ethyl beta-methylcrotonate and ethyl cinnamate*

Ethyl beta-methylcrotonate and ethyl cinnamate are reductively coupled employing the general procedure of Example 2, using a mole ratio of 0.5 mole cinnamate to 1.0 mole crotonate, and at a cathode potential of about —1.7 volts. The diethyl 3,3-dimethyl-4-phenyladipate is separated from the electrolysis medium and isolated by the usual procedures.

EXAMPLE 8

*Electrolytic mixed reductive coupling of diethyl maleate and acrylamide*

Diethyl maleate and acrylamide are reductively coupled employing a molar excess of the acrylamide in concentrated aqueous tetraethylammonium toluene-sulfonate solution at a cathode potential circa —1.5 volts (vs. saturated calomel electrode) to produce diethyl butane-1-carboxamide-3,4-carboxylate.

EXAMPLE 9

*Electrolytic mixed reductive coupling of ethyl acrylate and N,N-diethylacrylamide*

Ethyl acrylate and N,N-diethylacrylamide are reductively coupled in concentrated aqueous solution of tetraethylammonium p-toluenesulfonate at a cathode potential circa —1.9 volts to produce ethyl butane-1-(N,N-diethylcarboxamide)-4-carboxylate along with hydrodimerization products of the two olefinic reactants from which it is separated by fractional distillation.

It will be understood that the above examples are illustrative only and that various other combinations of alpha-beta-olefinic nitriles, carboxylates and carboxamides can be suitably employed in the present invention.

In general any members of the aforesaid classes of olefins can be employed, so long as they do not contain any reactive groups which would unduly interfere in the reductive coupling reaction, all such olefins capable of hydrodimerization by electrolysis being suitable for employment in combination with each other in the reductive coupling reactions of the present invention. For the most part the olefinic compounds employed will be mono-olefinic compounds which are hydrocarbon except for the designated functional groups and which contain from 3 to 8 carbon atoms, but this is a matter of practicality rather than necessity. Any of the olefinic compounds disclosed in my aforesaid copending applications can suitably be employed in the present invention. The following table includes various olefins, any pair of which can be reductively coupled according to the procedure of the present invention.

| Monomer | —E vs. saturated calomel electrode |
|---|---|
| $CH_2=\underset{\underset{CH_3}{\vert}}{C}-CN$ | 1.81 to 1.91 |
| $CH_3CH=CHCN$ | 2.08 to 2.11 |
| $(CH_3)_2C=CHCN$ | 2.01 to 2.05 |
| $(CH_3)_2C=\underset{\underset{CH_3}{\vert}}{C}-CN$ | ca. 2.15 |
| $C_6H_5CH=CHCN$ | 1.42 to 1.60 |
| $\underset{N\overset{\Vert}{C}CH}{CHCN}$ | 1.00 to 1.03 |
| $CH_2=CH-CH=CHCN$ | 1.42 to 1.50 |
| 1-cyano-cyclohex-1-ene | 2.15 to 2.20 |
| 1-cyano-cyclopent-1-ene | 2.13 |
| $CH_2=CHCOOEt$ | 1.85 |
| $Me_2C=CHCOOEt$ | 2.10 to 2.18 |
| $C_6H_5CH=CHCOOEt$ | 1.57 to 1.61 |
| $C_2H_5OCH=CHCOOEt$ | 2.22 |
| $\underset{\overset{\Vert}{C}HCOOEt}{CHCOOEt}$ | 1.32 to 1.40 |
| $\underset{\overset{\Vert}{C}HCOOC_8H_{17}}{CHCOOC_8H_{17}}$ | 1.41 |
| $\underset{\overset{\Vert}{C}HCOOC_4H_9}{CHCOOC_4H_9}$ | 1.30 |
| $\underset{C_{18}H_{17}OOCCH}{CHCOOC_8H_{17}}$ | 1.22 |
| $C_6H_5CH=C(COOEt)_2$ | 1.38 to 1.47 |
| $CH_3CH=C(COOEt)_2$ | 1.41 to 1.68 |
| $CH_2=CH-CH=CHCOOEt$ | 1.50 to 1.59 |
| $CH_2=CHCONEt_2$ | 1.91 to 1.95 |
| $CH_3CH=CHCONEt_2$ | 2.03 to 2.12 |
| $CH_2=CHCONH_2$ | 1.82 to 2.00 |
| $C_6H_5CH=CHCONEt_2$ | 1.67 to 1.73 |
| $C_6H_5CH=CHCOCH_3$ | 1.29 |
| $(CH_3)_2C=CHCOCH_3$ | 1.58 to 1.73 |

While the monomers can be combined indiscriminately according to the present invention, it is often desirable to select monomer pairs differing by at least 0.3 volt in order to effect better control of the coupling by effecting the reaction at or near the lower numerical value, thereby substantially avoiding production of the hydrodimer of the monomer requiring the higher numerical potential for hydrodimerization.

The surprising fact that the coupling reaction occurs at a cathode potential less negative than that required for hydrodimerization of one of the two olefinic compounds is explainable by the proposed mechanism of the electrolytic coupling reaction. It is postulated that one of the olefinic compounds first polarizes to a carbonium ion which then takes up two electrons at the cathode on its beta-carbon atom to form a dicarbanion. The dicarbanion then acts as a donor molecule, while the other olefinic compound has polarized to a carbonium ion which acts as an acceptor molecule. The dicarbanion bearing a negative charge on the beta-carbon atom couples with the carbonium ion bearing a positive charge on its beta-carbon atom. Protons are then extracted from the electrolyte medium to complete the reductive coupling. It can be seen that the proposed mechanism does not require electrolytic reduction of the acceptor molecule, and the coupling reaction can therefore be conducted at cathode potentials less negative than that required for reduction of one of the olefinic compounds involved. While the proposed mechanism of the reductive coupling reaction is considered valid, the present invention is not to be considered as limited to any particular mechanism as the reductive coupling occurs regardless of what the mechanism may be.

It will be recognized that some pairs from the designated classes of olefins will give better results than other pairs, depending upon the abilities of the two compounds to act as donors or acceptors. With regard to acrylonitrile, it should be noted that this compound is a very good acceptor, so better coupling results are obtainable with compounds having a less negative reduction potential than acrylonitrile, preferably substantially less negative than −1.9 volts (vs. saturated calomel electrode), as compared to results obtainable with compounds having a more negative potential which have to compete with acrylonitrile in the acceptor role.

Concentrated solutions of the olefinic compounds are employed in the present invention.

An electrolytic cell having a cathode of high hydrogen over-voltage is charged with the thus prepared solution and an electric current is passed through the cell to effect the reductive coupling reaction. Depending upon the concentration of the olefinic compound and upon the hydrogen ion concentration of the solution there may or may not be formed products other than the coupled products and saturated dimers. Thus, when working with concentrations of olefinic compound which are less than 10% or from 10 to 20% by weight of the solution, there may be formed compounds such as the reduced monomers or other condensation products. With acrylonitrile as a reactant, for example, propionitrile and/or bis(2-cyanoethyl)ether may thus be obtained as by-products. The hydrogen ion concentration of the solution should be above a pH of 7, i.e., the solution should be basic.

During electrolysis in a divided cell, alkalinity increases in the catholyte. However, the anolyte becomes acidic. When a porous diaphragm is used to separate the catholyte from the anolyte, the alkalinity of the catholyte will depend upon the rate of diffusion of acid from the anolyte through the porous barrier. Control of alkalinity in the catholyte, when employing a diaphragm, may thus be realized by purposely leaking acid from the anolyte into the catholyte. It can also be achieved, of course, by extraneous addition to the catholyte of an acid material, e.g., glacial acetic acid, phosphoric acid or p-toluenesulfonic acid. Alkalinity may also be controlled, whether or not a diaphragm is used in the cell, by employing buffer systems of cations which will maintain the pH range while not reacting at the reaction conditions.

When the olefinic compounds include a carboxylate, the pH of the solution should not be allowed to rise to the point where substantial hydrolysis of the ester occurs. Since the lower alkyl esters, i.e., the methyl or ethyl esters, are usually more readily hydrolyzed than the higher alkyl esters, the optimum pH will vary with the nature of the ester. When the olefinic compounds include acrylonitrile, it will be desirable to maintain the pH at substantially below 9.5 in order to avoid or substantially minimize cyanoethylation. Otherwise, substantial quantities of bis(beta-cyanoethyl)ether are obtained. Similarly, when other olefinic nitriles are employed, it will be necessary to maintain the pH low enough to substantially minimize addition of water to the double bond.

Among the salts which can be employed according to the invention for obtaining the desired concentration of dissolved olefinic compound, the amine and quaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of varoius acids, especially various sulfonic acids. Especially preferred are aliphatic and heterocyclic quaternary ammonium salts, i.e., the tetraalkylammonium or the tetraalkanolammonium salts or mixed alkyl alkanol ammonium salts such as the alkyltrialkanolammonium, the dialkyldialkanolammonium, the alkanotrialkylammonium or the N-heterocyclic N-alkyl ammonium salts of sulfonic or other suitable acids. Further specific examples of suitable amine and ammonium cations will be given below in setting forth specific salts suitable for use in the present invention. The saturated aliphatic or heterocyclic quaternary ammonium cations in general have suitably high cathode discharge potentials for use in the present invention and readily form salts having suitably high water solubility with anions suitable for use in the electrolytes employed in the present invention. The saturated, aliphatic or heterocyclic quaternary ammonium salts are therefore in general well adapted to dissolving high amounts of olefinic compounds in their aqueous solutions and to effecting reductive couplings of such olefinic compounds. It is understood, of course, that it is undesirable that the ammonium groups contain any reactive groups which might interfere to some extent with the reductive coupling reaction. In this connection it should be noted that aromatic unsaturation as such does not interfere as benzyl substituted ammonium cations can be employed; (and also by aryl sulfonate anions).

Among the anions useful in the electrolytes employed in the present process, the aryl and alkaryl sulfonic acids are especially suitable, for example, salts of the following acids: benzenesulfonic acid, o-, m-, or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5-sulfonic acid, mesitylene-2-sulfonic acid, durene-3-sulfonic acid, pentamethylbenzenesulfonic acid, o-dipropylbenzene-4-sulfonic acid, alpha- or beta-naphthalenesulfonic acid, o-, m- or p-biphenylsulfonic acid, and alpha-methyl-beta-naphthalenesulfonic acid. As explained heretofore, alkali metal salts are useful in the present invention with certain limitations, and the alkali metal salts of such sulfonic acids can be employed, i.e., the sodium, potassium, lithium, cesium or rubidium salts such as sodium benzenesulfonate, potassium p-toluenesulfonate, lithium o-biphenylsulfonate, rubidium beta-naphthalenesulfonate, cesium p-ethylbenzenesulfonate, sodium o-xylene-3-sulfonate, or potassium pentamethylbenzenesulfonate. The salts of such sulfonic acids may also be the saturated, aliphatic amine or heterocyclic amine salts, e.g., the mono-, di- or trialkyl-amine salts, or the mono-, di- or trialkanolamine salts, or the piperidine, pyrrolidine, or morpholine salts, e.g., the ethylamine, dimethylamine or triisopropylamine salt of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or beta-naphthalenesulfonic acid or of the cumenesulfonic acids; the pyrrolidine salt of o-, m-, p-amylbenzenesulfonate; the morpholine salt of benzenesulfonic acid, of o-, m- or p-toluenesulfonic acid, or of alpha- or beta-naphthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o- or m-toluenesulfonate or benzenesulfonate; tetraethylammonium o-, m- or p-cumenesulfonate or o-, m- or p-ethylbenzenesulfonate, tetramethylammonium benzenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alpha-ethyl-beta-naphthalenesulfonate; tetraethanolammonium o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium alpha or beta-naphthalenesulfonate or o-, m- or p-butylbenzenesulfonate, trimethylethanolammonium benzenesulfonate or o-, m- or p-toluenesulfonate; N,N-di-ethylpiperidinium or N-methyl-pyrrolidinium o-, m- or p-hexylbenzenesulfonate or o-, m- or p-toluenesulfonate, N,N-di-isopropyl or N,N-di-butylmorpholinium o-, m- or p-toluenesulfonate or o-, m- or p-biphenylsulfonate, etc.

The tetraalkylammonium salts of the aryl or alkarylsulfonic acids are generally preferred for use as the salt constituents of the electrolysis solution because the electrolyses in the tetraalkylammonium sulfonates are exclusively electrochemical processes.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and poly-amines and di- and poly-ammonium radicals are operable and included by the terms amine and ammonium. The sulfonate radical can be from aryl, alkyl, alkaryl or aralkyl sulfonic acids of various molecular weights up to for example 20 carbon atoms, preferably about 6 to 20 carbon atoms, and can include one, two or more sulfonate groups. Any of the quaternary ammonium sulfonates disclosed and claimed in my copending application S.N. 75,123, filed December 12, 1960, can suitably be employed.

Another especially suitable class of salts for use in the present invention are the alkylsulfate salts such as methosulfate salts, particularly the amine and quaternary ammonium methosulfate salts. Methosulfate salts such as the methyltriethylammonium, tri-n-propylmethylammonium, triamylmethylammonium, tri-n-butylmethylammonium, etc., are very hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other cations are suitable for use in the present invention, e.g., tetraalkylphosphonium and trialkyl sulfonium cations, particularly as sulfonate salts formed from sulfonic acids as described above, or as methosulfate salts.

It is desirable to avoid acidity of the electrolyte in order to effect the process of the present invention, both because of interfering polymerization reactions of some olefinic compounds which occur in acidic media, and because the discharge of hydrogen ions which occurs circa −1.5 volts would make it virtually impossible to reach the more negative cathodic voltages required for most olefinic compounds of interest herein. If only a small amount of hydrogen ions are present at the start of electrolysis, it may be practical to electrolytically discharge such ions at the cathode until the pH goes over 7 and then to proceed with the reductive coupling while maintaining alkaline conditions as required. This assumes, of course, that the salt employed is not so acidic as to require that it all be destroyed in order to make the solution alkaline, or so acidic as to result in substantial expenditure of the olefins in side reactions during the discharge of the hydrogen ions.

The presently provided process provides a simple method for manufacture of a great many aliphatic polyfunctional compounds which are useful as organic intermediates, as monomers for the formation of polymers, and for various other purposes. The products containing both carboxylate and carboxamide groups can form high molecular weight condensation polymers, the carboxylate being hydrolyzed to the free acid prior to condensation if necessary, either alone or along with polyhydroxy compounds. The compounds containing carboxylate and carboxamide groups will also find use in functional fluid applications. The products having cyano groups along with carboxylate or carboxamido groups can be hydrogenated to form amino compounds having carboxylate or carboxamido groups, and the latter are useful in formation of high molecular weight condensation polymers, and of course the amino acids themselves constitute a class of compounds of recognized importance.

It is obvious that many variations may be made in the process of this invention without departing from the spirit and scope thereof.

What is claimed is:

1. The method of producing a reduced coupled product of two different olefinic compounds which comprises subjecting a solution of two different compounds selected from the group consisting of alpha,beta-olefinic nitriles, esters and carboxamides to electrolysis in contact with a cathode, the said two olefinic compounds differing in reduction potential vs. the saturated calomel electrode by at least 0.3 volt, the electrolysis being conducted in a divided cell in which both cathode and anode are in actual physical contact with electrolyte and at an amperage such that the cathode potential is close to that required for reduction of the more easily reducible olefinic compound, the solution comprising at least 10% by weight of the olefinic compounds, a salt selected from the group consisting of amine and quaternary ammonium sulfonates and alkylsulfates, and water, the solution being non-acidic and having a pH below the value at which substantial hydrolysis of the ester group occurs when one of the olefinic compounds is an olefinic ester, and below the value at which substantial addition of water to the double bond occurs when one of the olefinic compounds is an olefinic nitrile and recovering the reduced, coupled product.

2. The method of producing a reduced coupled product of two different olefinic compounds which comprises subjecting a solution of two different compounds selected from the group consisting of alpha,beta-olefinic nitriles, esters and carboxamides in aqueous electrolyte to electrolysis by passing electric current through the solution in contact with a cathode having a hydrogen overvoltage greater than that of copper, the said two olefinic compounds differing in reduction potential vs. the saturated calomel electrode by at least about 0.3 volt, and the said electrolysis being conducted in a cell in which both cathode and anode are in actual physical contact with electrolyte, causing development of the cathode potential required for hydrodimerization of the more easily reducible one of the selected compounds, the solution consisting essentially of water, at least about 10% by weight of each of the selected compounds and a salt which discharges at more negative cathode potentials than the olefinic compounds, the solution being non-acidic and having a pH below the value at which substantial hydrolysis of the ester group occurs when one of the olefinic compounds is an olefinic ester, and below the value at which substantial addition of water to the double bond occurs when one of the olefinic compounds is an olefinic nitrile, and recovering the reduced, coupled product of formula corresponding to that from reductively coupling two molecules together, the molecules being of different olefinic compounds.

3. The method of claim 2 in which the solution comprises the olefinic compounds, water and a salt to make the solution conductive, the concentration of the salt being greater than about 30% by weight of the total amount of salt and water in said solution.

4. The method of claim 2 in which an alpha,beta-mono-olefinic nitrile of from 3 to 8 carbon atoms is reductively coupled with an alkyl ester of an alpha,beta-mono-olefinic carboxylic acid having from 3 to 8 carbon atoms in the acid portion of the molecule and 1 to 5 carbon atoms in each alkyl radical.

5. The method of claim 2 in which the pH is maintained at a value between 7 and 9.5 during substantially all of the electrolysis by passing electric current through the solution in contact with a cathode.

6. The method of claim 2 in which a 1-cyanobutadiene is reductively coupled.

7. The method of claim 2 in which the olefinic compounds are saturated hydrocarbon except for the olefinic and carboxylate, carboxamide and nitrile groups.

8. The method of producing a reduced, coupled product of two different olefinic compounds which comprises subjecting a solution of substantial amounts of two different olefinic compounds selected from the group consisting of alpha,beta-mono-olefinic nitriles, esters and carboxamides in aqueous salt electrolyte to electrolysis in contact with a cathode, the said two olefinic compounds differing in reduction potential vs. the saturated calomel electrode by at least about 0.3 volt, and conducting the electrolysis at an amperage such that the cathode potential is close to that required for reduction of the more easily reducible olefinic compound, the said solution consisting essentially of water, at least 10% by weight of said olefinic compounds, and a salt which discharges at more negative cathode potentials than the olefinic compounds, the solution being non-acidic and having a pH below the value at which substantial hydrolysis of the ester group occurs when one of the olefinic compounds is an olefinic ester, and below the value at which substantial addition of water to the double bond occurs when one of the olefinic compounds is an olefinic nitrile, and separating a reduced, coupled product of formula corresponding to that from coupling of the two olefinic compounds at their beta-carbon atoms with addition of hydrogen to saturate the olefinic bonds, the said electrolysis being conducted in a cell in which both cathode and anode are in actual physical contact with electrolyte.

9. The method of claim 8 in which a substantial excess of the less easily reducible olefinic compound is employed to direct the reaction toward the reduced, coupled product.

10. The method of forming cyano derivatives of olefinic compounds which comprises reductively coupling acrylonitrile with a compound other than acrylonitrile selected from the group consisting of alpha,beta-unsaturated carboxylates, carboxamides and nitriles, the selected compound being reducible at cathode voltages substantially less negative than −1.9 volts, by subjecting a solution of such compound and acrylonitrile in aqueous salt electrolyte to electrolysis by passing electric current through the solution in contact with a cathode, both cathode and anode being in actual physical contact with electrolyte and the electrolysis being conducted at an amperage such that the cathode potential is close to that required for the said selected compound, the solution consisting essentially of water, at least 10% by weight of acrylonitrile and said selected compound, and a salt which discharges at more negative cathode potentials than the olefin compounds, the solution being non-acidic and having a pH below about 9.5 and below the value at which substantial hydrolysis of the ester group occurs when the said selected compound is an ester, and removing from the electrolyte the reduced coupled product of formula corresponding to that from reductively coupling one molecule of acrylonitrile with one molecule of the said selected compound.

11. The method of claim 2 in which two different nitriles are reductively coupled.

12. The method of claim 2 in which a nitrile is reductively coupled with an ester.

13. The method of claim 2 in which a carboxamide is coupled with an ester.

14. The method of claim 2 in which a nitrile is reductively coupled with a carboxamide.

15. The method of claim 8 in which the electrolysis is conducted at a current of at least 0.5 ampere and the salt cation discharges at the cathode only at potentials substantially more negative than the potential at which the electrolysis is conducted.

References Cited by the Examiner
UNITED STATES PATENTS 2,632,729  3/53  Woodman _____ 204—72
2,726,204  12/55 Park et al. _____ 204—72

JOHN H. MACK, Primary Examiner.

MURRAY TILLMAN, WINSTON A. DOUGLAS,
Examiners.